June 11, 1957  E. H. LANGE  2,795,746
ELECTRIC CONDUCTION CONTROL ELEMENT UTILIZING
CONDUCTOR-INSULATOR COMPOSITE
Filed Dec. 18, 1953  2 Sheets-Sheet 1
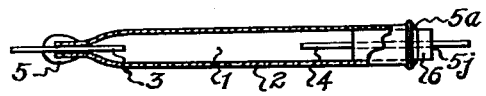
FIG. 1
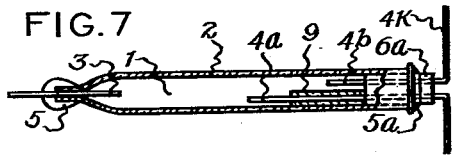
FIG. 7
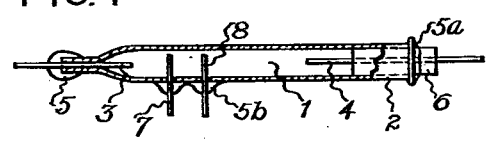
FIG. 8
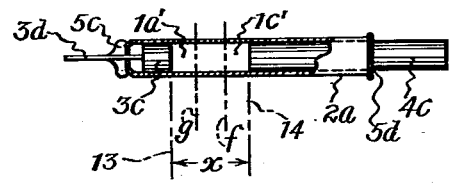
FIG. 2
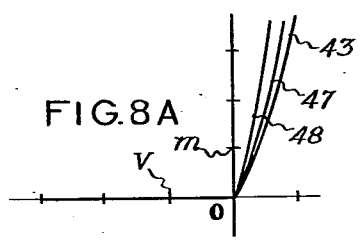
FIG. 8A
FIG. 3
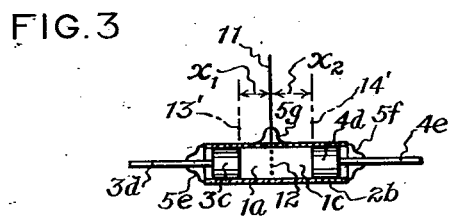
FIG. 3A
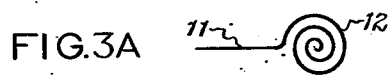
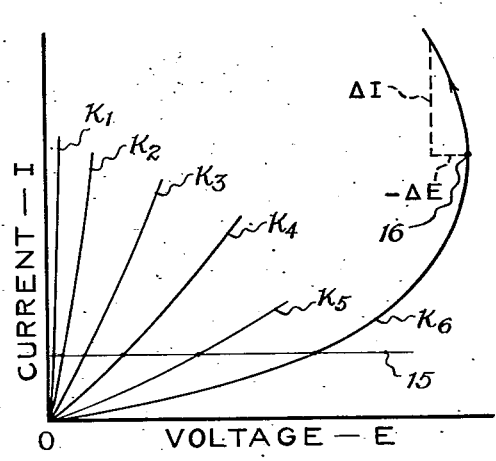
FIG. 6
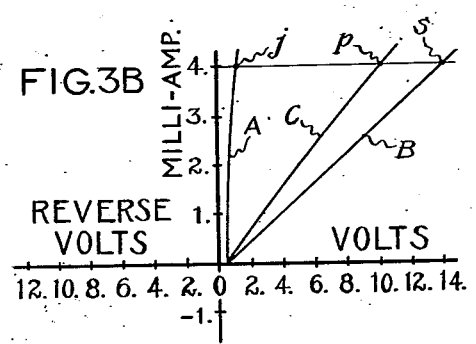
FIG. 3B
INVENTOR:
Edward H. Lange.

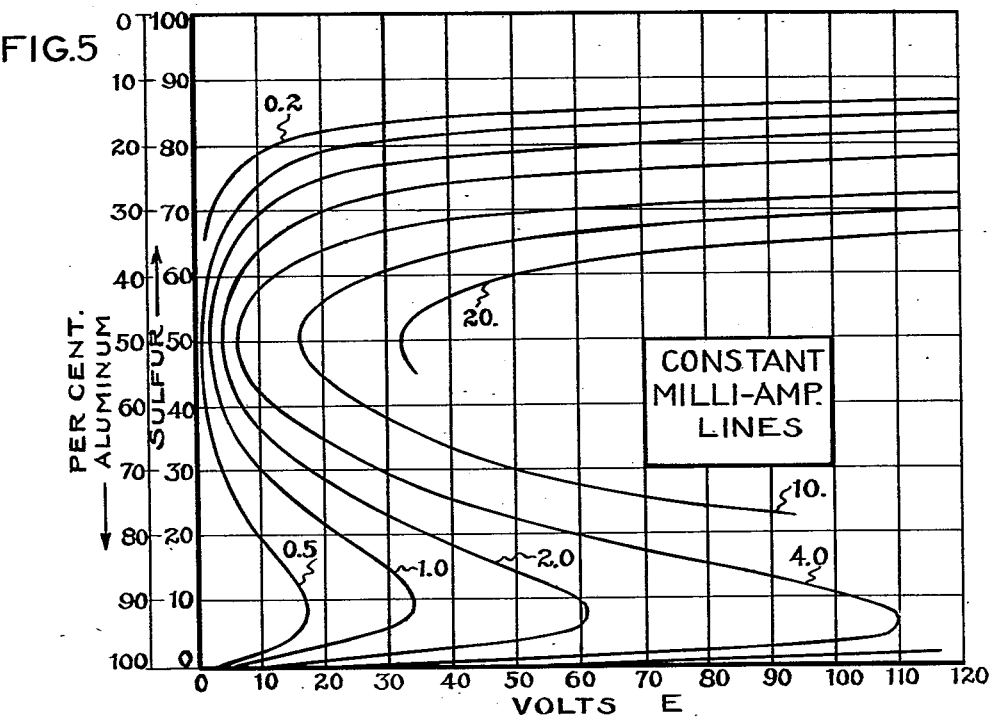
FIG.5
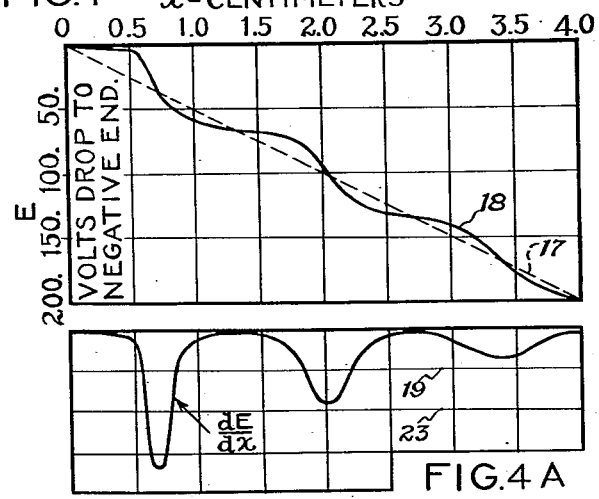
FIG.4
FIG.4A
FIG.4B
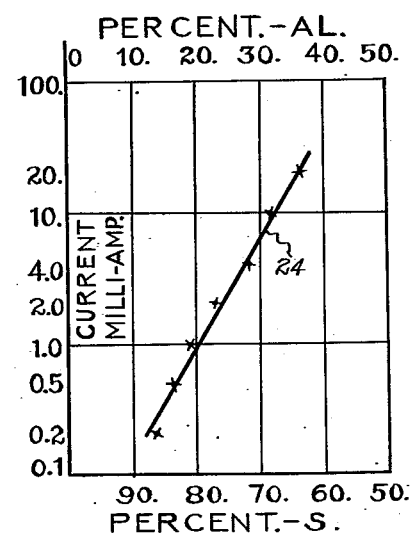
FIG.5A
INVENTOR:
*Edward H. Lange*

United States Patent Office 2,795,746
Patented June 11, 1957

2,795,746

ELECTRIC CONDUCTION CONTROL ELEMENT UTILIZING CONDUCTOR-INSULATOR COMPOSITE

Edward H. Lange, Baltimore County, Md.

Application December 18, 1953, Serial No. 399,083

14 Claims. (Cl. 317—235)

This invention relates to a novel method of and means for controlling electrical currents, including control of electrical conduction in relation to direction of applied voltage, or rectification, and particularly to electrical variations of magnitudes such as are useful in communications, in industrial control-circuits and the like.

A general object of the invention is to provide control means for electric currents in a novel and economical apparatus.

A principal object is to provide an electric circuit element having novel electric conduction control features, including means for establishing, controlling and utilizing space distributions of potential.

Another object is to provide a method and apparatus for establishing excess directional conduction, or rectification.

A further object is to provide novel means employing more than two electrodes for controlling voltage-current characteristics between said electrodes, including rectification.

This invention employs a composite of powdered or very finely divided particles of the elements aluminum and sulfur, thoroughly mixed, to secure certain unique conduction characteristics. As distinguished from so called semi-conductors, aluminum is well known to be among the best known electrical conductors, and sulfur to be among the best of electrical insulators.

Features of this invention are the discovery and utilization of the wave-like spatial potential distribution in such a composite, and the production of a high degree of excess directional conduction, or rectification.

Other features are the discovery and utilization of certain functional relations among voltage, current, and concentration of aluminum and sulfur; also the zonal range of concentrations favorable for attaining rectification characteristics, and a coefficient distinguishing this zone from other zones.

A further feature is a method for processing and accelerating a composite to a more stable lower resistance state, without substantial heat formation, and for carrying the forming currents to or through an initial negative variation-resistance characteristic.

Still another feature is the production of an asymmetric voltage-current relationship in an element having three electrodes.

Further objects and features of the invention appear more clearly and fully from the following detailed description of the illustrative embodiments thereof, taken in connection with the accompanying drawings in which:

Fig. 1 shows in partial section one embodiment of the invention, employing wire type electrodes.

Fig. 2 shows in partial section another embodiment of the invention with electrodes having disc type contact surfaces.

Fig. 3 shows in partial section an embodiment of the invention with electrodes having disc type contact surfaces, and an intervening grid member.

Fig. 3A shows in further detail the grid member of Fig. 3.

Fig. 3B illustrates in diagram form certain metrical relations among voltages and currents in an element as in Fig. 3, and asymmetry of voltages among electrodes.

Fig. 4 illustrates in diagram form a spatial distribution of potential in a composite embodied in this invention.

Fig. 4A illustrates in diagram form a spatial distribution of potential gradient corresponding to Fig. 4.

Fig. 4B illustrates in diagram form a spatial distribution of electric charges corresponding to Fig. 4.

Fig. 5 illustrates in diagram form characteristics of an aluminum-sulfhur composite, and a functional relationship of voltage to concentrations of aluminum and sulfur, for various constant currents.

Fig. 5A illustrates in diagram form a metrical relation between change of current and change of concentration of aluminum and sulfur, for a constant voltage, with reference to Fig. 5.

Fig. 6 illustrates in diagram form an initial characteristic and transition stages of a composite of this invention.

Fig. 7 shows in partial section another embodiment of the invention, employing three electrodes in the same enclosure.

Fig. 8 shows in partial section an embodiment of this invention with four electrodes in the same enclosure.

Fig. 8A illustrates in diagram form some characteristics of the element of Fig. 8.

Referring to the figures, there is illustrated in Fig. 1 a conduction element of this invention, with an envelope or enclosure 2 having high insulating properties, such as a glass tube or pipette. A copper wire electrode 3 extends into the enclosure 2 and for sufficient distance outside enclosure 2 to provide electrical connection thereon. At 5 is a seal between 3 and enclosure 2, firmly securing 3 in position, as for example a clear plastic cement, such as one known as Duco or DuPont's cement. At 6 is a cylindrical plug or stopper, having high insulating qualities, through the central axis of which passes a tightly fitting copper wire electrode 4, extending into the enclosure 2 and sufficiently outside the plug 6 to afford electrical connection to 4. The interior space 1 of enclosure 2 is understood to contain a composite of aluminum and sulfur as hereinafter described in further detail, extending between 3 and 4, contacting electrodes 3 and 4, and surrounding the portions of 3 and 4 which extend into the enclosure 2. At 5a is a seal of cement as stated, between plug 6 and enclosure 2, sealing and tightly holding plug 6 in position. Plastic cement is likewise applied to the junction between plug 6 and electrode 4, for example at 5j. To avoid unnecessary discription, it will be noted with reference to other figures that similar seals are employed, such as 5c, 5d, Fig. 2; 5e, 5f, 5g, Fig. 3; also 5 and 5a, Fig. 7, and 5, 5a, and 5b, in Fig. 8, to securely hold the respective electrodes passing from the interior to exterior of the respective enclosure and seal the enclosure. Likewise glass tube enclosures of modified form are illustrated at 2a, Fig. 2, and at 2b, Fig. 3.

Fig. 5 illustrates in graph form functional relations found to exist in composites containing a mixture of powders of aluminum and powders of sulfur. The volume percentage of powders of aluminum and sulfur is indicated upon the vertical scale; the applied voltage between electrodes such as 3 and 4, Fig. 1, is indicated by E upon the horizontal axis. Each of the characteristic lines is drawn for a constant current between electrodes, the milliampere magnitude of constant current being indicated upon each characteristic line. The volume percentage as referred to here is deduced from measured equilibrium lengths in a cylindrical glass tube, containing either powdered sulfur or powdered aluminum, and measurement in each instance is made for percentage determination purpose only after the powder has been mechanically vibrated in a vertical tube for a sufficient period to reach a dimensional equilibrium. Two such measured quantities each of sulfur and aluminum, are then thoroughly mixed to assure uniform distribution of sulfur through aluminum and vice versa. When a certain volume percentage mixture ascertained in this manner is placed in the enclosure, such as 2, Fig. 1, it is likewise vibrated to assure a normally compacted condition, of measured length as desired. The plug 6 for example, is then inserted, and the composite slightly further compacted to assure contact with electrode, such as 4. In a newly assembled element initial applications of voltage to start current flow are substantially higher than voltages required after flow has started. With the higher sulfur percentages several hundred volts are required, for example in a length of about three and a half centimeters. Application of such initial voltages may be through a series protecting resistor, or by pulsing, i. e. by quick interruption upon application of voltage until current flow is started, and reduction of voltage thereafter.

Referring to Fig. 6, a series of transitional stages of conductance is illustrated graphically, for example for a composite having 30 percent aluminum and 70 percent sulfur. Current through an element such as Fig. 1 is illustrated, and indicated by I along the vertical axis; voltage applied to electrodes 3—4 is indicated by E along the horizontal axis. At $K_6$ is shown a relationship of applied voltage and current flow for a newly assembled conductance element after current flow has started. Reduced voltage will be followed by reduced current along the lower part of the characteristic, e. g. below a current such as shown at 15, and to relatively small values, unless the flow breaks completely.

At 16 is shown a special or critical value of voltage and current, designated respectively by $E_c$ and $I_c$. At this critical point, the current tends to increase spontaneously without limit, and the voltage to decrease. If allowed to proceed to this point, the conductance element may be damaged or destroyed by the amount of heat developed, depending upon the percentage composition. This phenomenon appears somewhat similar to the well known Townsend-Thomson type of self-maintained ionization. The characteristic beyond the critical point 16 exhibits a negative variation-resistance indicated by $-\Delta E/\Delta I$, wherein $-\Delta E$ is the decrement of voltage and $\Delta I$ the corresponding increment of current.

At $K_5$, $K_4$, $K_3$, $K_2$, and $K_1$ are illustrated subsequent higher conductance characteristics, one or more of which the conductance tends to assume with passage of time. In the initial characteristic, $K_6$, no rectification is present in the element, the current-voltage relation being substantially the same for either direction of voltage.

In the course of collecting data upon elements of the type described, conductance characteristics have been observed to suddenly jump, for example from $K_5$ to $K_1$. The history of conductance transitions of a particular element indicates that the various transitional stages into which the conductance tends to lock, are approximately related by a factor $e^{N\phi}$, i. e. for a particular current such as indicated at 15, the relative voltages required in the several stages are given $N=1, 2, 3, 4$, etc. respectively for $K_1$, $K_2$, $K_3$, $K_4$, etc., $\phi$ being a constant.

Rectification, or excess directional conduction, was originally found to be present in an element which was ten days old. Numerous checks upon various older elements having a large variety of aluminum-sulfur percentages disclosed the presence of a zone of rectification, with reference to Fig. 5. This zone extends from approximately 50 percent aluminum—50 percent sulfur upwards, through 30 percent aluminum—70 percent sulfur, i. e. among the upper characteristics of Fig. 5. Certain properties of these upper characteristics quantitatively distinguished from lower characteristics will be referred to later, in further detail herein.

In further reference to Fig. 6, a feature of this invention is a method of forming and expediting the formation of voltage barriers for producing a high degree of directional discrimination as to current flow. This is accomplished by energizing the initially assembled conductance element to or through the critical value of voltage $E_c$ and current $I_c$, without the production of undesirable amounts of heat. This procedure employs pulsing the voltage and current to or through the above-noted critical values. Since the heat developed is in proportion to the product of the applied voltage E and current I and time T, by periodically energizing the conductance element so that the voltage is applied for a brief time $t_1$ and disconnected for a time $t_2$, the average power employed can be kept sufficiently low so that the conductance element does not exceed a lukewarm condition. In this manner a large quantity of electricity can be employed in the negative resistance range for more rapid reduction of conductance to one of the lower numbered characteristics, such as $K_1$ or $K_2$. Formation of a voltage barrier after pulsing usually requires about three days.

The direction of maximum conduction is generally in the same direction in which the conductance element has been energized, as above described for formation of a voltage barrier. Instances have been observed however, of reversal of maximum conduction direction, after a voltage barrier has been broken down by excessive voltage, accompanied by change of characteristic, for example from $K_2$ to $K_1$.

Referring to Fig. 2, there is illustrated a glass enclosure $2a$ with cylindrical copper electrode $3c$ at one end therein, connected electrically to external conductor $3d$. Fitted into the other end of $2a$ is the longer cylindrical electrode $4c$, such that the electrode $4c$ is movable axially. Lines indicated by 13, and 14 are projection lines from the disc-ends of electrodes $3c$ and $4c$ respectively which are nearest together within $2a$, and the distance between these disc-ends is indicated by $x$. The distance $x$ is thus adjustable, and suitable for variation in the measurement of characteristics of powdered composites. Fig. 4 is illustrative of the space variation of potential E in a conductance element as in Fig. 2, in which the entire interior space within $2a$ between disc-ends of electrodes $3c$ and $4c$ is filled with a composite of 30 percent aluminum mixed with 70 percent sulfur, and for a constant current of 4 milli-amperes. In the diagram, Fig. 4 the distance $x$ in centimeters is indicated horizontally, this same scale of distances being applicable to Fig. 4A and Fig. 4B which are directly under Fig. 4. In Fig. 4, applied voltage is indicated by E in volts along the vertical axis. The heavy line 18 indicates an experimentally determined potential drop to the negative end of the conductance element for a constant current of 4 milli-amperes, and for the lengths $x$ as specified. For comparison, the straight broken-line 17 is drawn as a line of uniform potential drop.

The wave-like nature of the space variation of potential is particularly to be noted, and certain sharp changes in potential particularly for the smaller range of distances. These features will be more clearly evident from Fig. 4A and Fig. 4B. The vertical scale of Fig. 4A indicates the potential gradient for any value of $x$, that is, it is the value $dE/dx$ derived from curve 18, Fig. 4. This is shown in the heavy line curve of Fig. 4A. The vertical distance between lines 19 and 23 indicates a scale of voltage gradient of 100 volts per centimeter. The corresponding space distribution of the variations of potential gradient of Fig. 4, i. e. the values of $d^2E/dx^2$ derived from Fig. 4 are shown in the heavy line curve of Fig. 4B. Both positive and negative values of $d^2E/dx^2$ are shown, the vertical distance between lines 21 and 22 representing a scale of 1000 volts/cm.$^2$.

From the well known Poisson's equation, an accumulation of charge density is indicated by the magnitude $$\rho = -\frac{\epsilon}{4\pi} \cdot d^2E/dx^2$$

in which $\rho$ is the charge density, and $\epsilon$ the dielectric constant.

The potential distribution curve 18 is for the particular constant current stated; variants of this distribution occurs for other current magnitudes, and also include steeper gradients, and a potential valley.

Fig. 3 illustrates a glass tube 2b into which are fitted the cylindrical copper electrodes 3c and 4d; electrode 3c being electrically connected by exterior connecting wire 3d, and 4d being electrically connected by exterior connecting wire 4e. At 12 is a spiral grid of fine copper wire, having a few convolutions. Lead-wire 11, which may be a continuation of the wire of the spiral grid 12, is brought through a hole in the wall of tube 2b at a position between the disc-end contact surfaces of electrodes 3c and 4d, which contact surfaces are nearest together within the tube 2b. The plane of the spiral convolutions of grid 12 is arranged to be substantially parallel to the disc-end contact surfaces, that is, transverse to the axis of the tube 2b. The lead-wire 11 for external electrical connection with the copper spiral grid 12 is sealed to tube 2b, and firmly supported, for example by the plastic cement seal 5g. At 13' and 14' are indicated projection lines respectively coincident with the planes of the disc-end contact surfaces of electrodes 3c and 4d. The distance between disc-end contact surface of 3c for contacting composite, and one side of spiral grid 12 is indicated by $x_1$, and the distance between disc-end contact surface of 4d for contacting composite, and the other side of spiral grid 12 is indicated by $x_2$. Electrodes 3c and 4d are each made adjustable as to distances $x_1$ and $x_2$ respectively from the spiral grid 12, for selectively locating the spiral grid 12 in relation to voltage gradients and selected zones of electric charges in the composite medium.

Before describing further the conductance properties obtainable with the composite media and structures of this invention, certain further features pertaining to these composites will be pointed out. Referring to Fig. 5, and to the previously mentioned upper characteristics, in the zone extending upwards from approximately 50 percent aluminum—50 percent sulfur through 30 percent aluminum—70 percent sulfur, and identified with production of rectification characteristics, it will be noted that for any particular constant current as the percentage of the conducting metal aluminum increases the required voltage decreases, and vice versa, and that the percentage change is relatively high for voltage in relation to a change of aluminum concentration. For example, at 80 volts, the constant current lines are nearly parallel, and have very little slope from the horizontal axis. Likewise, for a constant voltage, the currents increase very rapidly with a small increase in aluminum concentration. This is illustrated in graph form in Fig. 5A, for a constant voltage of 80 volts. In this figure, percentage of aluminum, designated by AL and percentage of sulfur designated by S, is shown along the horizontal axis, and magnitude of currents in milli-amperes is shown in a logarithmic scale along the vertical axis, for line 24.

The above-described large changes in electrical conductivity related to small changes in concentration of aluminum or sulfur, are important features of this invention, operative in the previously described electrical method of forming voltage barriers without substantial heat formation. In the mixture, a pair of aluminum particles with intervening sulfur particle has an aluminum-sulfur boundary and a sulfur-aluminum boundary, for a particular direction of current flow; these boundaries may be differentially modified as to resultant concentrations in surface layers at these boundaries, by the enforced electron movement in the magnitude and manner previously described for barrier formation. Further discussion of resultant or net rectification produced in a minimum of two such series-connected boundaries, is hereafter given in further detail, as to pertain physical principles, and as to physical features determining different saturation current densities for each of said boundaries.

For purposes of this invention, a parameter or coefficient $\beta$ is defined for change in voltage at a constant current, in relation to change of metal concentration, as as:

$$\beta = \frac{\delta E}{\delta \alpha}\bigg|_{I=\text{constant}}$$

in which $\delta E$ is an increment of voltage, $\delta \alpha$ an increment in metal concentration, and $\beta$ a voltage-concentration coefficient. A zone of rectification production has been identified with negative values of $\beta$.

Referring to Fig. 8, a conductance element is illustrated similar to that described for Fig. 1, modified in respect to two spaced side-electrodes extending transversely through holes in the tube 2. At 7, for example, is a metal strip electrode, such as Monel metal, or copper, extending from the exterior of tube 2 into the interior of tube 2, transversely, and spaced from electrode 3. At 8 is a similar electrode spaced from electrode 7 and parallel to 7, extending transversely through the wall of tube 2 into the enclosure within tube 2.

Fig. 7 illustrates a conductance element with enclosure 2 similar to that of Fig. 1, with modification in respect to the two electrodes 4a and 4b, spaced from each other, parallel to the axis of enclosure 2, and each extending into enclosure 2 and through the insulating plug 6a, for external electrical connection thereto. At 4k is an external electrical connection for the electrode 4b. One of these electrodes may be longer than the other, for modifying the conductance characteristics. An insulating means such as sleeve 9 tightly fitting over a part of the longer electrode 4a is then employed, tightly abutting the interior portion of insulating plug 6a, and permitting an uninsulated end of electrode 4a to extend into the composite within tube 2.

Some general characteristics may be noted with reference to Fig. 8A, which figure will also be useful in pointing out some of the characteristics of other structures.

In Fig. 8A applied voltages are represented along a horizontal axis, an arbitrary unit of which is shown by the voltage scale vo. Currents in milli-amperes are represented along a vertical axis, a current scale division such as mo representing one milli-ampere. Voltages to the right of o are forward voltages, i. e. in the direction of maximum current conduction. Voltages to the left of o are reverse voltages, i. e. in the direction of minimum conduction. Current for reverse voltage is shown as substantially zero, upon the milli-ampere scale. In these elements the reverse current is usually less than several micro-amperes, except that the reverse current passes through certain maxima as certain magnitudes of reverse voltage are reached. These maxima are usually less than 40 micro-amperes, until a reverse voltage sufficient to break through a voltage barrier is reached. On one side of such a maximum of reverse current, the backward current is decreasing with increased backward voltage; a useful negative variation-resistance characteristic is thus provided in this range of backward voltages.

As an example of magnitudes, when the device of Fig. 8 contains a composite of 30 percent aluminum and 70 percent sulfur, which has previously been energized between electrodes 3 and 4 for establishing a voltage barrier, a scale of five volts may be applied to the arbitrary unit vo. Curves 43, 47, and 48, are respectively for resultant currents with applied voltages between electrodes 4 and 3, electrodes 4 and 7, or electrodes 4 and 8. Respective voltages do not follow a simple ratio of respective electrode spacings.

With the composites of aluminum-sulfur described, reverse voltages as high as 50 volts have been observed, without breakdown of voltage barrier; breakdown limit of voltage barriers is however not generally this high, being substantially less than this amount particularly for smaller separations of electrodes. It will also be noted that while some conduction elements will start with regularity, with low voltages, others may require a pulse of higher voltage in the direction of maximum conduction to start flow of current.

In Fig. 7 widely differing conductance properties are obtainable, there being a selection of terminals and a selection of polarities for initial energization to form voltage barriers. For example with electrode 3 positive, electrode 4b positive, and electrode 4a negative, voltages as high as fifteen times larger may be required between electrodes 3 and 4a than between tlectrodes 4b and 4a, to provide the same currents, in each instance in the direction of maximum conduction.

In Fig. 3B certain resultant voltage-current properties are illustrated for the structure of Fig. 3, in particular when the interior space 1a between electrode 3c and grid 12 is filled with a composite of aluminum-sulfur, and the interior space 1c between grid 12 and electrode 4d is filled with the same percentage aluminum-sulfur composite, for example 30 percent aluminum—70 percent sulfur; also when spacings between 3c and grid 12 of approximately 0.6 cm. are employed, with spacings of 0.8 cm. between grid 12 and the electrode 4d, and open spaces between convolutions of spiral grid 12 of approximately 0.5 mm., with diameter of wire in grid 12 of 0.25 mm. Original energization is carried out with positive terminal of applied voltage connected to electrode 3c, and with currents circulated separately through electrode 4d, and through grid 12.

The rectification characteristics are such that for applied voltage between 3c and 4d, maximum conduction occurs with 3c positive; for applied voltage between 3c and grid 12, maximum conduction occurs with 3c positive, and for applied voltage between grid 12 and 4d, maximum conduction occurs with grid 12 positive. Currents in milli-amperes are shown along the vertical axis, with voltage being shown along the horizontal axis, to the right of zero for the direction of maximum conduction.

Curve A is for the current from 3c to grid 12; curve B is for current from 3c to 4d, and curve C is for current from grid 12 to 4d. The voltage asymmetry is particularly to be noted, in respect to the same magnitudes of current for curves A, B, and C. It will be noted that a natural voltage bias of about 0.6 volt is present, which must be overcome before any substantial rise of current starts. At $j$, $s$, and $p$ are the respective voltages required to send the same current, e. g. 4 milli-amperes through either parts or all of the composite. Specific values in this instance are $j=1.1$ volts, 3c to grid 12; $s=14$ volts, 3c to 4d; and $p=10$ volts, grid 13 to 4d. Of the 1.1 volts for j indicated, only 0.5 volt needs to be added in active voltage above the bias, to provide 4 milli-amperes between 3c and grid 12. The voltage asymmetry is particularly evident from the fact that while 14 volts is required to send 4 milliamperes through the entire length of composite, from 3c to 4d, and 10 volts to send the same current from grid 12 to 4d, a differential of 4 volts would be indicated as necessary to send this current from 3c to grid 12, whereas only an added voltage of 0.5 volt above natural 0.6 volt bias is actually required.

For the purpose of affixing an approximate mass conversion scale for the volume percentages of aluminum and sulfur as used herein, it wil be noted that equal masses of certain finely divided particles of aluminum and sulfur, measured for the stated dimentional equilibrium give a volume ratio of aluminum to sulfur of approximately 6.03 to 5.25. It should be noted that volume percentages stated herein are all approximate, in that the small amounts of impurity naturally present or present in the commercial products are included as if parts of pure sulful or pure aluminum.

Particle sizes and shapes vary over a wide range; in an illustrative sample for aluminum, 80 percent of the particles fall within a range of 20 to 40 per mm.

It will be noted that in an idealized medium of tightly packed uniform spheres, i. e. a simple cubical lattice, the ratio: volume of spheres to total volume is $\pi/6$ or 52.3 percent, the remaining volume being 47.7 percent. For this special condition the spheres are just contacting each other. Gaps exist when the spheres occupy a smaller percentage of the volume.

In further reference to Fig. 4, and the wave-like spatial distribution of potential, a uniform percentage composition was utilized for illustration between electrodes 3c and 4c, Fig. 2. It will be evident that modifications in the spatial potential distribution and voltage-current characteristics can be effected in the conduction elements by employing zoned spaces for variant composites. Zones such as 1a', 1c', or an intervening space as illustrated between projection lines g and f, Fig. 2, may be employed. Composites having different $\beta$ values may be used, and for example plus $\beta$ and minus $\beta$ values. As an illustration, in Fig. 3, space 1a may contain plus $\beta$ values and space 1c minus $\beta$ values, or vice versa. It will be understood that spaces 1a and 1c may each be diminished by inclusion of an intervening zone such as gf, including the grid member 12 for employing different $\beta$ values, e. g. 1a and 1c may have $-\beta$, grid 12 $+\beta$, or vice versa.

The elements aluminum and sulfur utilized here, occupy a position of symmetry in period III of the periodic table of elements, aluminum with atomic number 13 being two elements from one end of the period and sulfur with atomic number 16 being two elements from the other end. According to the electron configuration of elements, e. g. see Introduction to Modern Physics, Richtmyer and Kennard, both aluminum and sulfur have the same inner electron shells of 2, 2, 6, electrons, comprising an inert neon core. In the outer shell aluminum has three additional electrons, whereas sulfur has six, this shell requiring 8 electrons to be filled. Detachment of some single outer electrons of aluminum and tendency of some sulfur atoms to acquire electrons to fill the deficiency of this shell may play a role in the ionizing actions of this device.

With reference to hypotheses or theories of electric conduction under the precise circumstances of the present invention, the writer is not aware of any literature setting forth the exact process. It may be noted that in the literature, J. Frenkel in Wave Mechanics, Translation of Einführung in die Wellenmechanik, Dover Publications, Inc. 1950, gives a theoretical treatment of properties of contacts. This treatment includes concepts from wave mechanical theory that electrons can pass from one metal to another across gaps substantially larger than the interatomic distances. The discussion involves application of the theory of an electron gas in metals, Fermi-Dirac distribution function, and the modern quantum statistics and wave mechanical theory, based largely upon interpretive results from solutions of Schrödinger's wave equation. This equation deals with waves of probability amplitudes propagated with reference to the variants of action, as distinguished from waves as more commonly understood, propagated with respect to the variants of space and time. Likewise the Band Theory of Metals is concerned with solutions of this equation, and resultant concepts of quantum states, and allowed and forbidden energy bands.

It may be open to reasonable doubt that if an application of the above-noted quantum statistics and wave mechanical theory precisely fitting the present subject matter were at present available, it could be acceptable as coming within the scope of explanations and terms reasonably understandable by those skilled in the art.

Certain pertinent principles are hereafter pointed out, without however necessarily subscribing to any particular theory.

After the particles of aluminum and sulfur are in contact in the mixture, an equilibrium is established. In general, when contact between a metal and a poorly conducting substance is made, a coincidence of the separate Fermi-energy levels is established, the Fermi-energy being identified with the maximum kinetic energy of a free electron at zero degrees Kelvin, or absolute zero temperature, $T=0$. At approximate room temperature, or $T=290$ degrees, conditions are substantially the same for the Fermi-Dirac distribution function, the magnitude of KT being only about 0.025 electron-volts, K being Boltzmann's constant, $1.38 \times 10^{-16}$ erg per molecule per degree Kelvin, and an electron-volt being $1.6 \times 10^{-12}$ erg. In the absence of any externally applied voltage, a transfer of electrons takes place which ends only when the above-mentioned equilibrium is completed, resulting in automatic establishment of a contact-potential difference between the substances. The difference of work-functions of the two substances is thus balanced by the amount of the contact-potential difference, the work-function for each substance being identified with the excess work per electron, or electron-volts above the Fermi-energy level necessary to remove a free electron from the substance at the boundary, against internal restraining forces.

Contact-gaps exist between particles of unlike material, these contact-gaps being distinguished from gaps between like materials previously referred to herein. The contact-gaps are extremely small, it being probable that many of them are of the order of magnitude of one tenth micro-centimeter. Very high electric field intensities may be set up in the contact-gaps by small voltages across the contact-gaps. It will be noted that it is known from publications of Millikan and Eyring, and others, e. g. Physical Review 1926, 27, 51, and 1933, 44, 277, that electrons can be extracted from cold metals by high electric field intensities.

Some general features of an equilibrium between a metal and a poorly conducting substance in contact with it can be visualized from the Richardson-Sommerfeld relationship for electron emission. Contact implies very small dimensions; some effects of a range of small separations and contact surface-effects are later referred to herein. From the Richardson equation, current density of electron emission is the product of a constant B by $T^2$ by $e-V_w/KT$, in which $e=2.718$, $V_w$ is the work-function for a material in electron-volts, and KT as previously identified. As noted above, a balance of oppositely directed flows, or zero resultant, exists when the negative exponents are equalized. Externally applied voltages across such a junction or boundary are in the nature of additions to or deductions from the negative exponent, modifying this balanced condition. Designating the externally applied voltage across a contact or boundary, per se, by V, from such considerations it may be deduced that the current density produced across the junction is of the form: $u=U_s(e^{V/KT}-1)$ for forward current and $-u=U_s(1-e^{-V/KT})$ for backward current, the terms forward and backward applying as commonly understood to high and low conductivity directions, respectively.

$U_s$ is a saturation current density, to which the current density is limited for backward voltages. It should be noted that the bracketed factors, indicating a rapid increase of forward current density with increase of V, and limited backward current density with increase of $-V$ for the junction per se, are not primarily responsible for useful resultant or net rectification, as sometimes implied in literature. The reason for this is that a circuit must include at least two junctions in series; the current is a forward current for one junction and a backward current for the other, and vice versa for reversed current, the current density being limited to $U_s$ for either direction of current, producing no resultant rectification, when no other modifying factors are present.

The saturation current density $U_s$ is a most important factor in the conduction process; its dependence upon and modification by several factors being hereafter pointed out. Without any modification of $U_s$, a resultant rectification is indicated when the physical difference in two series-connected junctions or boundaries is merely a difference in areas of contact, such as the well known point and base-area contacts; the relative saturation currents being $aU_s$ and $AU_s$, in which the ratio $A/a$ of base-area to point-area may be large.

When distances involved are of the order of magnitude of atomic dimensions, it is apparent that the concept of a surface in the idealized geometrical sense has but limited physical meaning when applied to materials. For example, if a surface is understood to coincide with the nuclei of the outermost atoms at the boundary, then because of the trajectories of bound electrons in outer electron-shells extending beyond these nuclei, a layer of negative charges will protrude beyond this surface. A double-layer of charges may thus be produced, with an inner positive charge and outer negative charge.

In a substance with crystal structure, such as the element sulfur, atoms are believed to be spaced in a lattice pattern with a high degree of regularity. In addition to surface effects, transmission of an electron through a crystal structure by applied voltages is believed to be subject to periodic potential changes having a periodicity of the crystal lattice. This superposed periodicity of potential within the crystal lattice leads to energy bands in which transmission is either possible or forbidden, this condition being brought about by selective reflection of electron waves within the crystal structure. See e. g. R. L. Konig and W. G. Penney, Proc. Royal Soc. (London), 1930, A130, 499. Changes of the energy spectrum for electron transmission are such that for lower energies the allowed regions are reduced practically to points, whereas for the higher energies the forbidden regions are reduced to points, the corresponding conditions changing from those of a bound electron to those of a free electron, respectively. The current density $U_s$ is modified by these means, and may be further modified by lattice defects, and by impurities contained in the lattices.

The discontinuity of potential energy across a double layer of surface charges has been treated by J. Frenkel, including theoretical calculations of the potential jump across a double layer, and probable thickness of such layers; e. g. second edition, 1936, previously noted publication, and Phil. Mag. April 1917. Total reflection of electrons impinging upon the boundary from the inside of the material is believed to play an important part in determining stratification of charge at the boundary. In reference to the saturation current density $U_s$, the resultant must take account of the potential jumps to which an electron is subjected in crossing a boundary. This may be taken into account by corresponding modification of negative exponent. It can be readily shown that the calculated electron current density as dependent upon potential discontinuities of this nature is of the form: $U_s=BT^2 e^{-V_b/KT}$, in which B, as for Richardson's equation, has a theoretical value of: $4\pi m e_1 K^2/h^3$, in which the electron rest-mass $m=9.1 \times 10^{-28}$ grams, the electron charge $e_1=4.8 \times 10^{-10}$ electrostatic units, and $h=6.62 \times 10^{-27}$ erg $x$ seconds, and $V_b$ is a resultant of potential discontinuities connected with the boundaries, in electron volts. As applied to thermionic emissions, the theoretical value B of Richardson's equation of about 120 amperes/cm.$^2$/deg.$^2$ is known to be generally too large.

When two material surfaces or boundaries are brought together, contact is likely to exist only for very small parts; the greater areas will in all probability be separated by contact-gaps larger than atomic distances. Provided these contact-gaps are not too high a multiple of atomic dimensions, theoretical calculations are possible for a contact-gap transmission factor. In the process of total reflection of electrons impinging upon a boundary from within the material, effects of reflected electrons penetrate beyond the boundary. A result due to Fowler and Nordheim (Proc. Roy. Soc., London, 1928, 119, 173) agreeing in form with the results of Millikan, et al., previously noted, was utilized by J. Frenkel to determine a contact-gap transmission factor. This factor reduces to the form: $e\gamma |V|d$ in which $|V|$ is the absolute value of voltage across the contact-gap in electron volts, regardless of backward or forward direction, $d$=contact-gap in cm., and $\gamma = \sqrt{2m}/V_{wa} \times \pi/h$, $V_{wa}$ being an average of the work-functions for the contacting substances. The range for which the relationship may hold is limited to: $\frac{1}{2}\gamma d >> KT = 0.025$ electron volts; this condition holds for contact-gaps not larger than about $10^{-7}$ cm. It will be noted that the saturation current density increases with both voltage and contact-gap distance, in this limited range. The contact-gap and surface-layer effects together give a saturation current density of the form: $U_s = BT^2 e^{-V_b/KT} \times e\gamma|V|d$.

It will thus be seen that even if there were no area differences of contacts, the saturation current densities per se, may differ at the various junction because of these effects. The conduction process heretofore described for the composite structure, may utilize any or all of the above-described physical features. As heretofore pointed out concerning relative spatial factors of the aggregates of particles and electrode spacings, the internal resistance contains a range of resistance values with distance, including periodic variation of resistance, a region of said aggregates having negative variation-resistance, and regions of said aggregates containing a resultant electric charge.

It is to be understood that this invention is not to be construed as limited to the particular forms disclosed herein, as these are to be regarded as illustrative rather than restrictive, and that various modifications may be made therein without departing from the scope and spirit of the invention.

What is claimed is:

1. A circuit element which contains a composite mixture consisting principally of a body of finely divided sulfur powder and a body of finely divided aluminum powder mixed together, enclosure means for said mixture having high insulating properties, and electrodes, each making contact with said mixture.

2. Apparatus as defined in claim 1, wherein said body of finely divided sulfur occupies a greater volume than the body of finely divided aluminum.

3. Apparatus as defined in claim 1, wherein said body of finely divided sulfur occupies a volume substantially equal to that of the body of finely divided aluminum.

4. Apparatus as defined in claim 1, wherein said electrodes include an electrically conducting member embedded in said mixture.

5. Apparatus as defined in claim 1, wherein said electrodes include an electrically conducting member having a plane surface contact with the mixture.

6. The method of making an electrical device which includes making a mixture of a body of finely divided particles of sulfur and a body of finely divided particles of aluminum, compacting said mixture, and passing pulses of electric current through said mixture of sufficient magnitude to electrically energize said mixture to the proximity of spontaneous breakdown of electrical resistance, without substantially heating said body of particles.

7. A circuit element containing finely divided particles of aluminum and finely divided particles of sulfur, enclosure means including an envelope member having high insulating properties, and a plurality of electrodes each making contact with particles of said aluminum and sulfur.

8. Apparatus as defined in claim 7, wherein one of said electrodes is a grid member.

9. Apparatus as defined in claim 7, wherein one of said electrodes is a grid member spaced between two other electrodes, and wherein two different mixtures of said sulfur and aluminum particles are employed, one of said mixtures between one of said electrodes and said grid member, and the other of said mixtures between said grid member and the other of said electrodes.

10. Apparatus as defined in claim 7, wherein the contact surface of one of said electrodes is spaced between the contact surfaces of two other electrodes.

11. Apparatus as defined in claim 7, wherein one of said electrodes is a grid member spaced between two other electrodes, and wherein two different mixtures of said sulfur and aluminum particles are employed in three zones within said envelope member, an intermediate one of said zones containing said grid member and one of said mixtures.

12. An electric circuit element having rectifying means, comprising a mixture containing principally a body of finely divided particles of sulfur and a body of finely divided particles of aluminum, enclosure means for said particles having high insulating properties including an envelope member, and electrodes each making contact with particles of said mixture, said body of surfur particles being at least equal to said body of aluminum particles.

13. An electric circuit element having the principal body for transmission of electric currents therethrough comprising a body of particles of surfur mixed with a body of particles of aluminum.

14. Apparatus as defined in claim 13, wherein said body of particles of sulfur is at least substantially equal to the body of said particles of aluminum.

References Cited in the file of this patent

UNITED STATES PATENTS

| | | |
|---|---|---|
| 1,711,974 | Snelling | May 7, 1929 |
| 2,267,954 | Schumacher | Dec. 30, 1941 |
| 2,509,909 | Davis | May 30, 1950 |